United States Patent [19]

Hashizume

[11] Patent Number: 4,788,883
[45] Date of Patent: Dec. 6, 1988

[54] ROTOR FOR A DRIVING DEVICE

[75] Inventor: Akio Hashizume, Tokyo, Japan

[73] Assignee: Yasuyoshi Hashizume, Tokyo, Japan; a part interest

[21] Appl. No.: 119,442

[22] Filed: Nov. 12, 1987

[51] Int. Cl.$^4$ .......................... G05G 1/00; G05G 3/00
[52] U.S. Cl. ........................................ 74/572; 74/603; 74/604
[58] Field of Search .................. 74/572, 574, 572 F, 74/406, 64, 595, 597, 603, 604

[56] References Cited

U.S. PATENT DOCUMENTS

| | | | |
|---|---|---|---|
| 4,422,263 | 12/1983 | Masubuchi | 74/572 |
| 4,498,015 | 2/1985 | Gottfried | 74/572 |
| 4,594,917 | 6/1986 | Ziegler | 74/572 |
| 4,606,193 | 8/1986 | Molina | 74/572 |
| 4,623,320 | 11/1986 | Kakizaki et al. | 74/572 |
| 4,643,035 | 2/1987 | Murphy | 74/572 |

FOREIGN PATENT DOCUMENTS

| | | | |
|---|---|---|---|
| 445749 | 2/1949 | Italy | 74/572 |
| 0080543 | 7/1981 | Japan | 74/572 |
| 0190144 | 11/1982 | Japan | 74/572 |
| 0013044 | 1/1986 | Japan | 74/572 |
| 726387 | 4/1980 | U.S.S.R. | 74/572 |
| 2018391 | 10/1979 | United Kingdom | 74/572 |

Primary Examiner—Richard E. Moore
Assistant Examiner—Vinh Luong
Attorney, Agent, or Firm—Jordan and Hamburg

[57] ABSTRACT

The rotor of a driving device comprises an output shaft with transmission wheels fixed on the output shaft. The rotor is provided with a plurality of rotor bodies and a transmission device which is interlocked with the transmission wheels. Each rotor body is equipped with a plurality of rotating body parts on a support shaft in a free rotatable manner. Balance bodies are attached to these rotating body parts through pins located at eccentric positions of these balance bodies in a manner to provide free rotation. Crank bodies, driven by the rotating bodies, are freely-rotatably equipped on the support shafts. Where the output shaft rotates by an input from an external source, the rotating bodies also rotate at the same time. In addition, the balance bodies also rotate in association with the rotation of these rotating bodies. Therefore, the crank bodies prevent a state that parts of the balance bodies protrude outwardly from the rotating bodies. Thus, the inertial force of the rotating bodies is ensured.

9 Claims, 6 Drawing Sheets

ROTOR FOR A DRIVING DEVICE

BACKGROUND OF THE INVENTION

The present invention relates to a rotor for a driving device that can generate a large output with a small input.

When a large inertial force is required for a turbine and generator known in the prior art, a large diameter flywheel is used or the revolution frequency is increased.

However, increasing the flywheel diameter results in larger scale equipment resulting in higher manufacturing costs. The increase of revolution frequency consumes more energy and is not preferable in view of safety.

The objective of the present invention is to provide a rotor for a driving device that can conserve energy with a large output generated with a small input, in a safe and low-cost manner.

DETAILED DESCRIPTION OF THE INVENTION

The present invention relates to an output part and a rotor part that receives a driving force from the output part. The output part is provided with an output shaft and a transmission wheel fixed on this output shaft. The rotor part is equipped with a plurality of rotor bodies and a transmission means driven by a driving wheel. Each rotor body comprises an assembly of a support shaft with a plurality of rotating body parts in a freely rotatable manner. Each rotating body is provided with balance bodies each having a rotating pin. The position of each pin is located eccentrically to the balance body so that a part of the balance body is protrudable outwardly from the rotating body. The support shaft is equipped with a crank body driven by the rotating body via the transmission means, in a freely rotatable manner. The balance body is positioned so that it is well balanced with the balance body of the adjacent rotating body around the support shaft.

Where a rotating input is applied to the output shaft from an external source, the output shaft rotates and, as the transmission gear also rotates at the same time, the rotating bodies also rotate. When the rotating bodies rotate, the crank body revolves. Therefore, the crank body prevents a part of the balance bodies from continuing to protrude outwardly from the rotating body. Thereby, the inertial force of the rotating body is ensured.

The advantages of the present invention will be more deeply understood by the following description referring to the drawings.

DESCRIPTION OF THE PREFERRED EMBODIMENTS

Figure 1:
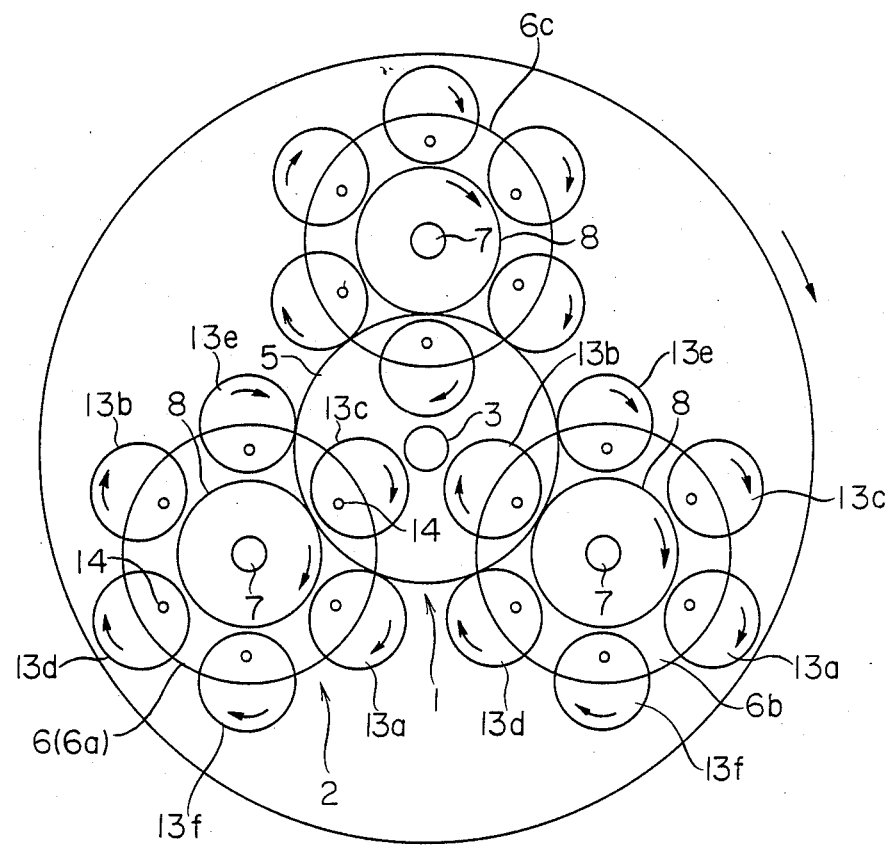
FIG. 1 illustrates the relationship between the output part and the rotor part.
Figure 2:
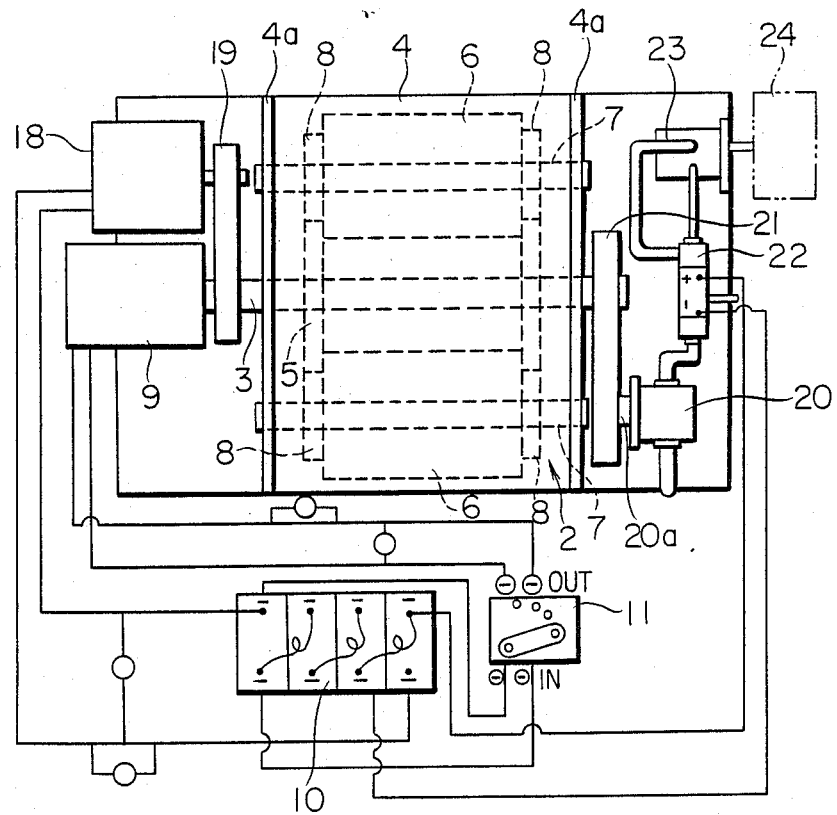
FIG. 2 is a drawing for describing operating conditions.

Referring to FIGS. 1 and 2, a rotor of the present invention comprises an output part 1 and a rotor part 2. The output part 1 and rotor part 2 are enclose within a casing 4 whose interior is maintained in a vacuum.

First, the detailed structure of the output part 1 is described in the following paragraphs.

An output shaft 3 is supported by side plates 4a, 4a of the casing 4 in the rotor part 2, in bearings in a free rotating manner. Transmission wheels 5, 5 are fixed on both sides of the output shaft 3. The shaft ends of the output shaft 3 protrude outwardly from side plates 4a, 4a. A DC motor 9 is connected to one shaft end. The motor 9 is connectable to and disconnectable from the output shaft according to the revolution frequency of the output shaft 3 by using a built-in control means for connection/disconnection. The control means functions to disconnect the output shaft 3 from the motor 9 when the revolution frequency of the output shaft 3 exceeds a predetermined revolution frequency, while continuing the connection where the revolution frequency is lower than the predetermined limit.

Next, the detailed structure of the rotor part 2 is described.

Referring to FIG. 1, a rotor means comprises three rotor bodies 6 (6a, 6b, 6c) arranged at intervals of 120 degrees each around the center of the output shaft 3. Through the shaft center of each rotor body 6 (6a, 6b, 6c), there is a support shaft 7. The support shaft 7 is equipped with freely rotatable transmission wheels 8, 8, 8. These transmission wheels engage a transmission wheel 5 of the output part 1. The transmission wheel 8 is fixed by threads (not illustrated) on the side face of rotating bodies 61, 63 (FIGS. 3, 4) on the rotor body 6.

The motor 9 is connected to a battery 10. Number 11 shows a DC switch.

Figure 3:
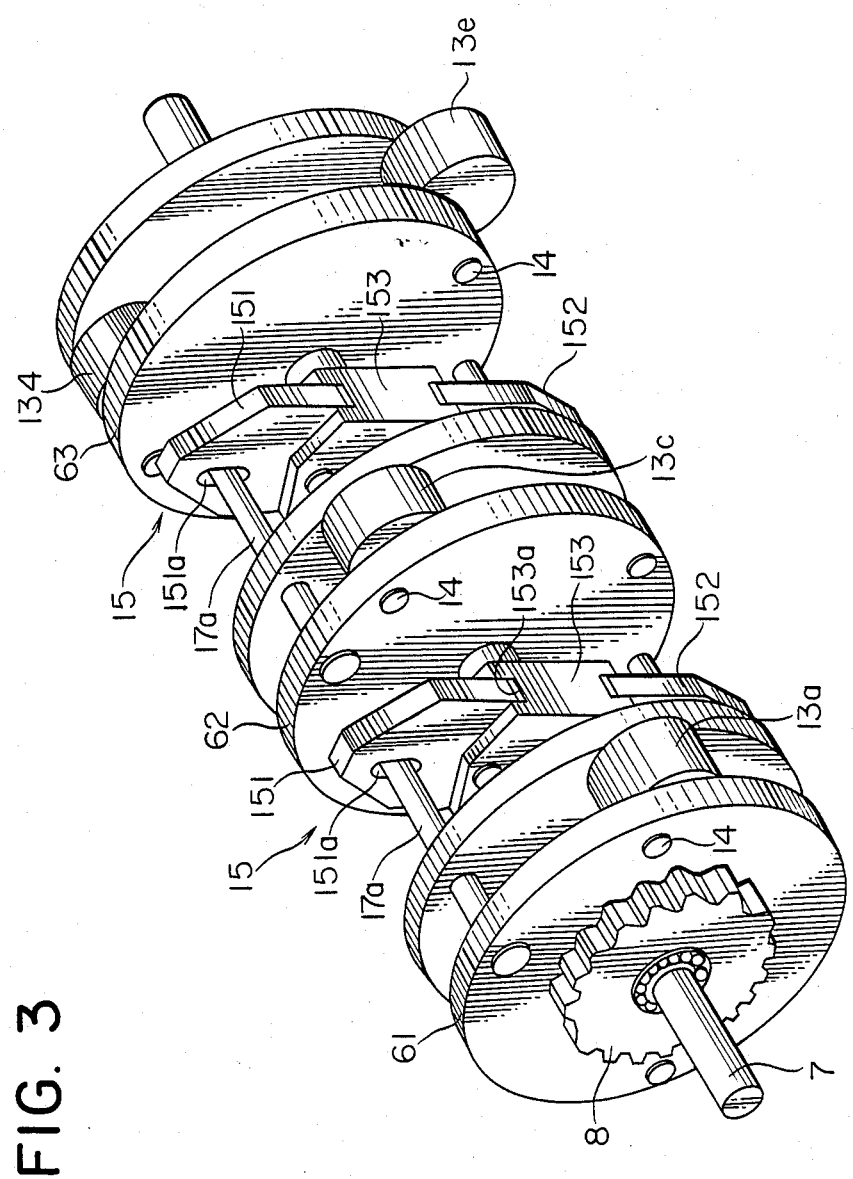
FIG. 3 is an enlarged oblique view of the important parts.
Figure 4:
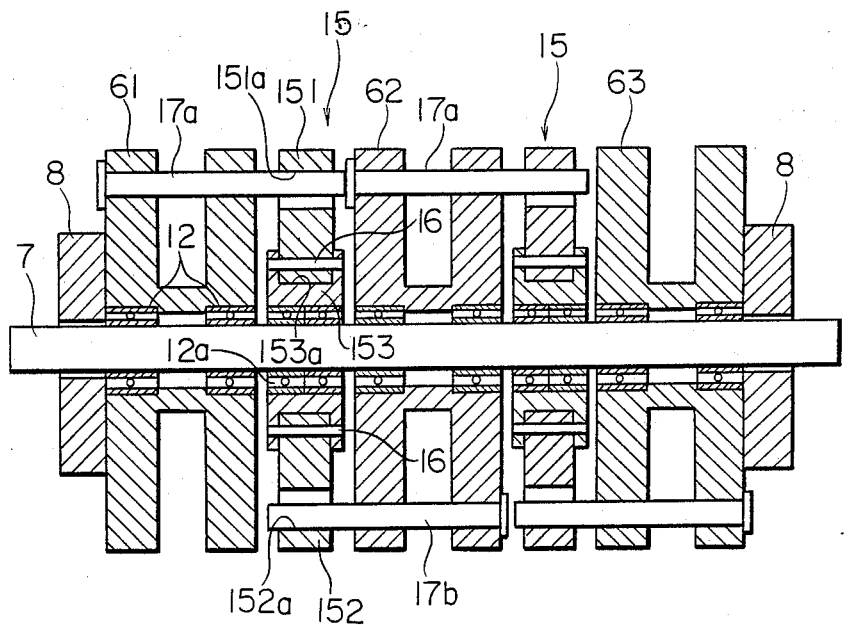
FIG. 4 shows an enlarged sectional view of the important parts.
Figure 5:
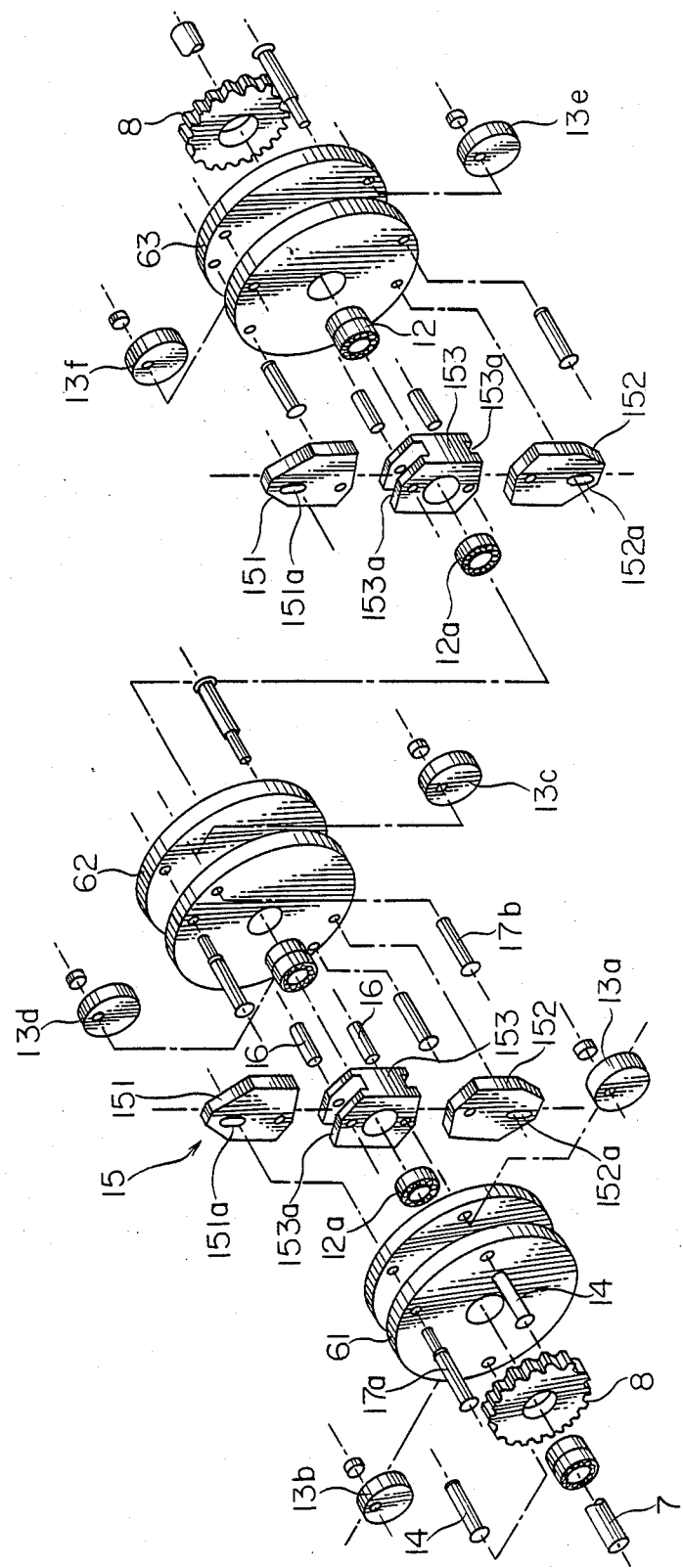
FIG. 5 is an exploded view of the important parts.
Figure 6:
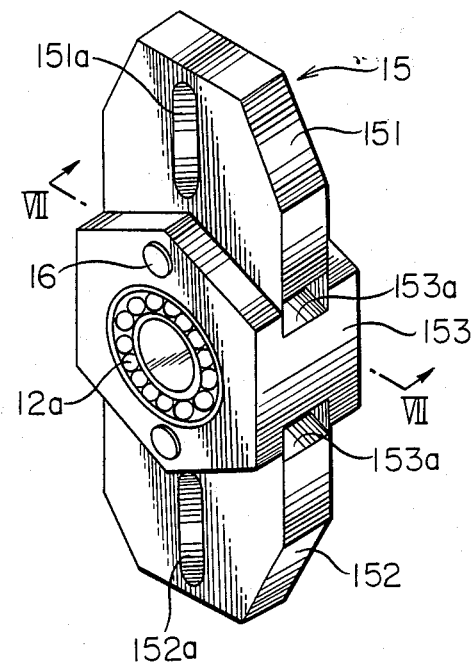
FIG. 6 shows an enlarged section of the crank body.
Figure 7:
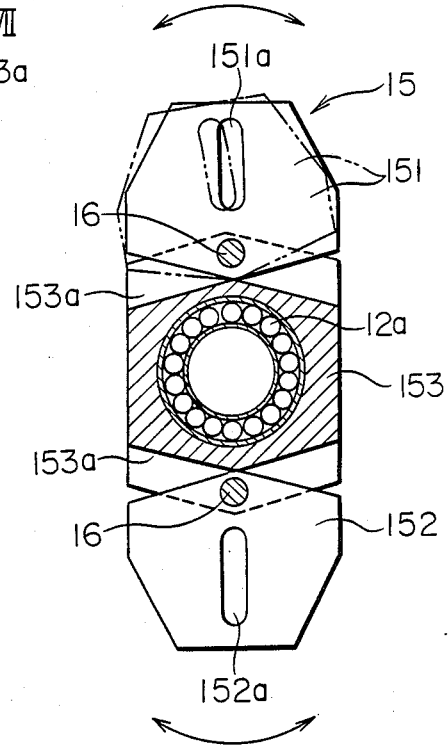
FIG. 7 is a sectional view of FIG. 6 along lines VII—VII.

Each support shaft 7 has a fixed axis. Three rotating body parts 61, 62, 63 are freely rotatably mounted on the support shaft 7 as shown in FIGS. 3~5, for constituting the rotor body 6, via bearings 12 spaced in an axial direction in a free rotating manner. The section of each rotating body 61~63 is formed in an H-shaped configuration. In its interior, balance pieces 13a and 13b, 13c and 13d and 13e and 13f are disposed, diagonally and each balancing between opposite pieces. Each balance piece 13a~13f is equipped with a pin 14 the outer periphery of rotating body parts 61~63. The pin 14 is located spaced from the center of the pieces 13a~13f, namely at an eccentric position so that a part of each balance piece protrudes outwardly from the outer periphery of the rotating body parts 61~63 when the bodies are rotating. Balance pieces 13a~13f are arranged, as shown in FIG. 1, so that each piece is located around the support shaft 7 at equal intervals. Crank bodies 15, 15 are mounted on the support shaft 7 via a bearing 12a in the side of rotating body parts 61~63 on each support shaft 7. The crank body 15 prevents continuing of a state where balance pieces 13a~13f protruding outwardly from the outer periphery of the rotating body parts 61~63 during their rotation due to centrifugal force. For this purpose, the crank body holds upper and lower crank plates 151, 152 in a free swinging manner at the center of a pin 16 within a groove 153a of the central support body 153, as shown in FIGS. 5~7. The inner end of each crank plate 151, 152 has a slope. The section of the bottom of the groove 153a with the support body is also shaped in a slope. The outer ends of the upper and lower crank plates 151, 152 are drilled with elongated holes 151a, 152a elongated in the up/down direction. Referring to FIG. 4, the upper long hole 151a receives a connecting pin 17a that is extended from the left adjacent rotating body part 61 (62) in a movable manner. A connecting pin 17b, extended from the right adjacent rotating body part 62 (63), penetrates the lower elongated hole 152a and is also movable. Therefore, each crank body 15 is activated by the rotation of the rotating body parts 61~63. The swing width of the upper or lower crank plate becomes smaller as the angle of the inner end of each upper or lower crank plate 151, 152 or the top angle of the bottom of the groove 153a in the support body 153 is larger.

Referring to FIG. 2, a timing belt 19 is disposed between one side of the output shaft 3 and a generator 18. The generator 18 is electrically connected to the battery 10. The generator 18 generates power by the rotation of the output shaft 3 for charging the battery 10 to compensate for power consumption.

A belt 21 is disposed between the other side of the output shaft 3 and the shaft 20a of the hydraulic pump 20. Driving power from the hydraulic pump 20 is transmitted to a hydraulic motor 23 via a solenoid valve 22, then reaches the generator 24.

The operation of the rotor of the present invention is described in the following. Rotating power of the motor 9 is transmitted from the output shaft 3 to rotating body parts 61~63 through transmission wheels 5, 8 in the rotating bodies 6a, 6b, 6c as shown in FIG. 1. Balance pieces 13a~13f eccentrically rotate around pins 14 as the rotating body parts 61~63 revolve in each rotor body. Parts of balance pieces 13a~13f protrude from the outer periphery of rotating body parts 61~63 (FIG. 1) by the centrifugal force created through high-speed rotation of the rotating body parts 61~63, while attempting to continue such protruded state. However, the upper and lower crank plates 151, 152 swing while destroying the balance between them, as the crank body 15 continues to rotate. Therefore, the state of the protruding balance pieces 13a~13f can no longer continue. Consequently, each rotor body 6a~6c is accelerated by the presence of balance pieces 13a~13f and the vacuum in the casing 4, thereby the acceleration is transmitted to the output shaft 3. When the revolution frequency of the output shaft exceeds a predetermined frequency, a control means is actuated to terminate the interlocked operation with the motor 9. As a result, an output, larger than the input, is generated in the output shaft 3. When the revolution frequency of the output shaft 3 decreases below the specified frequency, the driving force of the motor 9 is transmitted again to the output shaft 3. As the output shaft 3 rotates, generators 24, 18 shown in FIG. 2 start to generate power.

The range of the principles of the present invention is wide such as the rotor of a generator, an engine, a motor for a hydraulic press, etc. For example, where the rotor of the present invention applies to a hydraulic press, a large pushing force is obtained with a small input.

It is more preferable to maintain a vacuum in the casing 4, with a view to accelerate the rotor body 6 more quickly and maintain high-speed rotation of the same. The shape of the balance body is not limited to the shape of a spinning piece described above.

What is claimed is:

1. A driving device comprising an output shaft having a first transmission gear, a plurality of rotor bodies each having a second transmission gear engaged with said first transmission gear, each of said rotor bodies comprising a support shaft, each of said rotor bodies further comprising a plurality of axially spaced rotating body parts rotatably mounted on said support shaft, balance pieces each having an eccentrically located pin, said pin being rotatably mounted on an outer peripheral portion of said rotating body parts such that said balance pieces are rotatable relative to said rotating body parts, crank means rotatably mounted on said support shaft between two axially spaced rotating body parts, said crank means comprising a crank body and two diametrically opposed crank plates pivotably mounted on said crank body, said crank plates having elongated holes, a first connecting pin connected to a rotating body part disposed on one axial side of said crank means and extending into the elongated hole of one crank plate, and a second crank pin connected to a rotating body part located on the other axial side of said crank means and extending into the elongated hole of the other diametrically opposed crank plate.

2. A driving device according to claim 1, wherein said balance pieces have a generally cylindrical configuration, said cylindrically configured balance pieces having a geometric center, said eccentrically located pin being spaced from said geometric center.

3. A driving device according to claim 1, wherein each of said rotating body parts comprises two axially spaced body sections, said balance pieces being pivotably mounted between said two axially spaced body sections.

4. A driving device according to claim 3, wherein each of said rotating body parts has a generally H-shaped cross sectional configuration taken along an axial cutting plane.

5. A driving device according to claim 1, wherein said crank means comprises crank pivot pins for pivotably supporting said crank plates on said crank body, said crank pivot pins being located radially outwardly from the axis of said support shaft.

6. A driving device according to claim 1, wherein said elongated holes are elongated in a diametric direction relative to the axis of said support shaft.

7. A driving device according to claim 1, wherein there are three of said rotating bodies disposed about said output shaft, said output shaft and said support shafts being parallel to one another.

8. A driving device according to claim 1, wherein one of said rotating body parts of each rotating body constitutes a longitudinal end rotating body part, and means connecting said second transmission gear to said longitudinal end rotating body part.

9. A driving device according to claim 1, wherein each of said rotating body parts has a central hub section disposed about said supporting shaft and two axially spaced annular flange sections extending radially outwardly of said central hub section, said two annular flange sections being perpendicular to the axis of said supporting shaft, said balance bodies being disposed between said two annular flange sections, said eccentrically located pin being mounted in each of said two annular flange sections.

* * * * *